(12) United States Patent
Hong et al.

(10) Patent No.: US 7,774,538 B2
(45) Date of Patent: Aug. 10, 2010

(54) METHOD FOR TERNARY CONTENTS ADDRESS MEMORY TABLE MANAGEMENT

(75) Inventors: Seung-Woo Hong, Daejon (KR); Byung-Ho Yae, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 387 days.

(21) Appl. No.: 11/860,622

(22) Filed: Sep. 25, 2007

(65) Prior Publication Data

US 2008/0080539 A1   Apr. 3, 2008

(30) Foreign Application Priority Data

Sep. 29, 2006   (KR) .................. 10-2006-0095814

(51) Int. Cl.
*G06F 12/00* (2006.01)
(52) U.S. Cl. ................. 711/108; 711/156; 711/173; 711/221; 711/E12.014
(58) Field of Classification Search .............. None
See application file for complete search history.

(56) References Cited

U.S. PATENT DOCUMENTS 6,633,548 B2   10/2003   Bachmutsky et al.

2003/0056001 A1*   3/2003   Mate et al. ............ 709/238

FOREIGN PATENT DOCUMENTS

KR   1020040003258   1/2004
KR   1020050066866   6/2005

OTHER PUBLICATIONS

Notice of Korean Patent Grant dated Jul. 19, 2007 for the corresponding application KR-10-2006-0095814.

* cited by examiner

*Primary Examiner*—Reginald G Bragdon
*Assistant Examiner*—Shawn X Gu
(74) *Attorney, Agent, or Firm*—Ladas & Parry LLP

(57) ABSTRACT

Provided are a method for Ternary Contents Address Memory (TCAM) table management and a computer-readable recording medium for recording a program that implements the method. The method includes the steps of: a) dividing a memory area of TCAM into fixed-size blocks depending on priority to configure a lookup table; b) assigning a priority to each routing entry being inputted to the lookup table based on prefix length; c) storing the routing entry having been assigned with the priority in a lookup table block of a corresponding priority; and d) when a modification occurs in the lookup table, modifying the lookup table to maintain an arranged state for a longest prefix match.

11 Claims, 9 Drawing Sheets

FIG.1
(PRIOR ART)

| | | | 105 |
|---|---|---|---|
| DESTINATION | 11.1.2.5 | = 00001011.00000001.00000010.000000001 | |

| | | | |
|---|---|---|---|
| 110 — ROUTE#1 | 11.1.2.0/24 | = 00001011.00000001.00000010.000000000 |
| 115 — ROUTE#2 | 11.1.0.0/16 | = 00001011.00000001.00000000.000000000 |
| 120 — ROUTE#3 | 11.1.0.0/8  | = 00001011.00000001.00000010.000000000 |

PREFIX LENGH USED IN RETRIEVAL/COMPARISON

N : NUMBER OF ROUTING PREFIXS STORED
M : TCAM MEMORY SIZE

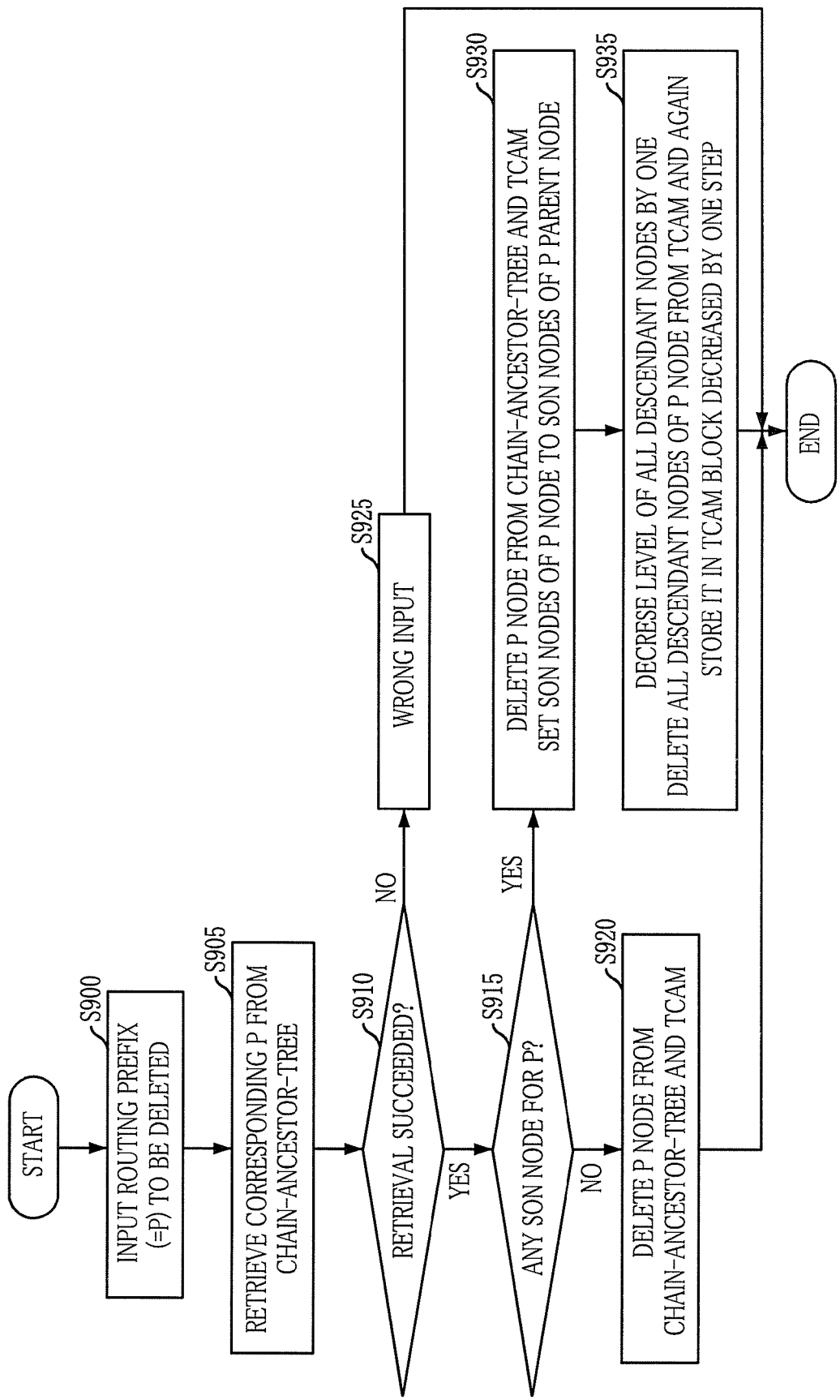

METHOD FOR TERNARY CONTENTS ADDRESS MEMORY TABLE MANAGEMENT

CROSS-REFERENCE(S) TO RELATED APPLICATIONS

The present invention claims priority of Korean Patent Application Nos. 10-2006-0095814, filed on Sep. 29, 2006, which is incorporated herein by reference.

BACKGROUND OF THE INVENTION

1. Field of the Invention

The present invention relates to a method for Ternary Contents Address Memory (TCAM) table management and a computer-readable recording medium for recording a program that implements the method; and, more particularly, to a method for TCAM table management, which is capable of maximizing memory utility of TCAM by effectively classifying and storing routing entries in the TCAM lookup table and also updating the lookup table for newly inputted routing entries more quickly and effectively, and a computer-readable recording medium for recording a program that implements the method.

This work was supported by the Information Technology (IT) research and development program of the Korean Ministry of Information and Communication (MIC) and/or the Korean Institute for Information Technology Advancement (IITA) [2005-S-101-02, "Multimedia QoS Routing Technology Development"]

2. Description of Related Art

In general, a router extracts a destination address of packet inputted for forwarding an Internet Protocol (IP) packet and looks up a forwarding table by using the extracted destination address as a key, to determine a next hop where the packet is to be forwarded. Such a routing lookup is performed in every router hop through which the packet passes, so that the packet eventually reaches from its originating node to the destination node.

A destination address of IP packet consists of a network address and a host address. Meanwhile, with the exponential growth of the Internet, a Classless Inter-Domain Routing (CIDR) scheme was adopted for more efficient and flexible use of IP address space in 1993. In the CIDR scheme, IP packet address is expressed simply in prefix/mask, not in IP network and host addresses. For example, in case of IPv4 using 32 bits, 129.254.191.xxx corresponding to the upper 24 bits of the mask in 129.254.191.0/24 is used as a network prefix address, and the remaining lower 8 bits are not used. Due to the address system of the CIDR scheme, it is required that a router stores numerous routing prefix addresses in a routing table, and a prefix address matching a destination address the longest (longest prefix match) in the IP lookup is determined as a resulting value. To help understand the foregoing, the longest prefix match will be described below with reference to FIG. 1.

FIG. 1 is an exemplary view for explaining a longest prefix match.

Referring to FIG. 1, three routing prefix addresses 11.1.2.0/24 (110), 11.1.0.0/16 (115), and 11.1.0.0/8 (120) are stored in a routing table, and a destination address 11.1.2.5 (105), which is the key value for IP lookup, is also stored therein. Further, there are binary expressions for the destination address 105 and each of the routing prefix addresses 110, 115, and 120 in FIG. 1 (the right side). The routing prefix address "110" has a 24-bit prefix length, the routing prefix address "115" has a 16-bit prefix length, and the routing prefix address "120" has an 8-bit prefix length. Therefore, the routing prefix address "110" matches with the destination address 11.1.2.5 (105) because only the upper 24 bits thereof are compared with each other. Similarly, the routing prefix address "115" matches with the destination address 105 because only the upper 16 bits thereof are compared with each other, and the routing prefix address "120" matches with the destination address 105 because only the upper 8 bits are compared with each other. Although these three routing prefix addresses 110, 115, and 120 all can be a resulting value for the destination address 105, the routing prefix address "110" with the longest prefix match, i.e., 24 bits, should be determined as a final resulting value.

As the scale of the Internet increased, the size of a lookup table to be stored in a router has increased. To cope with this and for longest prefix match in an enormous lookup table, a method for high-speed operation and efficient routing table management has been required. Traditionally, a software based method using hashing or trees have been frequently used as IP lookup technology used for development of a router. The software based IP lookup technology is advantageous in that it is easy to implement and is flexible for correction. However, as a memory has to be looked up several times for looking up for one destination packet, the above technology cannot meet the high-speed packet processing due to its slow speed.

Therefore, in recent years, a hardware based IP lookup technology using Content Addressable Memory (CAM) is often used for high-speed IP lookup, instead of the software based IP lookup technology. The CAM is a memory device that executes a search operation such as looking up for a corresponding match entry in a routing table in one clock cycle. That is, an input search key to the CAM is parallely compared with every entry in the CAM, to output a location where a corresponding entry is stored or its data.

Meanwhile, a Ternary CAM (TCAM) provides the function of expressing a mask of a routing prefix address stored in the routing table. The "ternary" used herein means that a value of information inputted to the TCAM can indicate the state of "don't care", in addition to "0" and "1" of binary values. For example, in case of the IPv4 routing prefix 129.254.191.0/24 in TCAM, the upper 24 bits are expressed in "1 or "0", while the remaining 8 bits can be expressed in "don't care" since they are not used.

Such a TCAM enables high-speed IP lookup processes, but by nature of the TCAM, a result stored in the highest address becomes always a final result when there are a number of match results. Therefore, for a longest prefix match, an arranged state should be maintained in a manner that a routing entry with a long prefix length can be always stored in a higher address than routing entries with relatively shorter prefix lengths. For a better understanding about this, how the results change depending on TCAM table arrangement states for a longest prefix match will now be described with reference to FIG. 2.

FIG. 2 is an exemplary view for explaining a longest prefix match process in TCAM.

Referring to FIG. 2, in a TCAM table 230 that is not arranged, a routing entry 129.254.xxx.xxx/16 (205) having a 16-bit prefix length is located in a virtual highest address 0 of the TCAM, and routing entries 129.254.12.xxx/24 (210), 129.254.14.1xx/30 (215) and 129.254.11.xxx/24 (220) are stored in memory addresses 1, 2, and 3 of the TCAM, regardless of the order of prefix lengths. In this case, when a TCAM lookup is performed with respect to the destination address 129.254.11.123 (200) inputted, routing entries "205" and "220" with TCAM addresses 0 and 3 match with the destination address, respectively. Thus, by the nature of the TCAM, a result value existing in the highest address in the TCAM table is selected, so the final lookup result will be "205" located in the address 0. However, this result does not meet the longest prefix match because the final result should have been "220" having a 24-bit prefix length, which is actually longer than "205" having a 16-bit prefix length.

On the other hand, in case of a table 235 that is arranged in the order of longer prefix, no matter how many lookup results may exist, a routing entry having the longest prefix length is always stored at the top location of the TCAM, so the longest prefix match is satisfied all the time. Therefore, the method for a TCAM lookup table management that maintains a state where routing entries stored in the TCAM are always arranged in the order of longer prefix is very essential to implement the high-speed lookup technology using the TCAM.

The following is a description for a conventional method for a TCAM table management for maintaining an arranged state of a lookup table with reference to FIG. 3.

FIG. 3 illustrates a conventional TCAM table structure for a longest prefix match, in which a 32-bit IPv4 is provided as an example.

Referring to FIG. 3, the conventional method for the longest prefix match was done simply by locating a routing entry having the longest prefix length at the top, routing entries having relatively shorter lengths at lower locations, and an empty memory space of the TCAM that is not yet allocated is located at the lowest location.

In this case, when a new routing entry is added, the TCAM table changes according to the following scenario. In case the newly added routing entry has a 30-bit prefix length, a memory location of the TCAM must be at a lower memory position than routing entries having a 31-bit prefix length and at a higher memory position than routing entries having a 29-bit prefix length so as to meet the longest prefix match. Therefore, a location for the memory address 3 (315) which is lower than "300", "305", and "310" in FIG. 3 will be appropriate. But, since a routing entry "315" having a 29-bit prefix length is currently stored in the memory address 3, it is necessary to move "315" first. "315" having a 29-bit prefix length may be moved to the memory address 4, but the memory address 4 has also been allocated to the routing entry "320", which means that the "320" routing entry has to be moved as well. After moving all the routing entries of memory addresses 4 to N–1 one by one to lower positions in this way, the new routing entry can be stored in the empty memory address 3. In other words, when the number of routing entries currently being stored in TCAM is 1 million, the worst scenario would be moving all of the 1 million routing entries one by one to lower positions in worst cases, and then inputting a new entry.

As described above, the conventional TCAM routing table arrangement method for the longest prefix match may not be efficient because many existing routing entries have to be moved. Moreover, in case of a high-speed router, the lookup process required for actual packet forwarding itself is heavily affected when TCAM table update takes too long. Therefore, a new method for resolving these is necessary. Even though several schemes for complementing the routing table management performance have been suggested, most of them have unsatisfactory efficiency and wasted a large amount of memory space of TCAM.

SUMMARY OF THE INVENTION

It is, therefore, an object of the present invention to provide a method for Ternary Contents Address Memory (TCAM) table management, which is capable of efficiently arranging routing entries for longest prefix match operation in maintenance/management of a TCAM table and optimally using TCAM without memory waste, and a computer-readable recording medium for recording a program that implements the method.

In other words, the present invention is to provide a method for a TCAM table management, in which a memory region of TCAM where routing entries are can be stored is divided according to priority and in which each routing entry being inputted is organized in the form of chain-ancestor-tree by prefix lengths and is prioritized by depths of trees, to store it in a TCAM memory area of a corresponding priority, and a computer-readable recording medium for recording a program that implements the method.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for Ternary Contents Address Memory (TCAM) table management, including the steps of: a) dividing a memory area of TCAM into fixed-size blocks depending on priority to configure a lookup table; b) assigning a priority to each routing entry being inputted to the lookup table based on prefix length; c) storing the routing entry having been assigned with the priority in a lookup table block of a corresponding priority; and d) when a modification occurs in the lookup table, modifying the lookup table to maintain an arranged state for a longest prefix match.

In accordance with another aspect of the present invention, there is provided a computer-readable recording medium for recording a program that implements a method in a routing system with a processor, the method including the steps of: a) dividing a memory area of TCAM into fixed-size blocks depending on priority to configure a lookup table; b) assigning a priority to each routing entry being inputted to the lookup table based on prefix length; c) storing the routing entry having been assigned with the priority in a lookup table block of a corresponding priority; and d) when a modification occurs in the lookup table, modifying the lookup table to maintain an arranged state for a longest prefix match.

As mentioned above, the present invention divides a memory region of TCAM where routing entries are can be stored according to priority and organizes each routing entry being inputted in the form of chain-ancestor-tree by prefix lengths and prioritizes it by depths of trees, to store it in a TCAM memory area of a corresponding priority. In addition, the present invention minimizes the movement of routing entries previously stored by effectively combining and dividing the chain-ancestor-tree, thereby quickly achieving routing updates.

BRIEF DESCRIPTION OF THE DRAWINGS

FIG. 1 is an exemplary view for explaining a longest prefix match.

FIG. 9 is a flowchart describing an example of a routing entry deletion process in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter. Thus, the present invention will be easily carried out by those skilled in the art. Further, in the following description, well-known arts will not be described in detail when it seems that they could obscure the invention in unnecessary detail. Hereinafter, preferred embodiments of the present invention will be described in detail with reference to the accompanying drawings.

Figure 2:
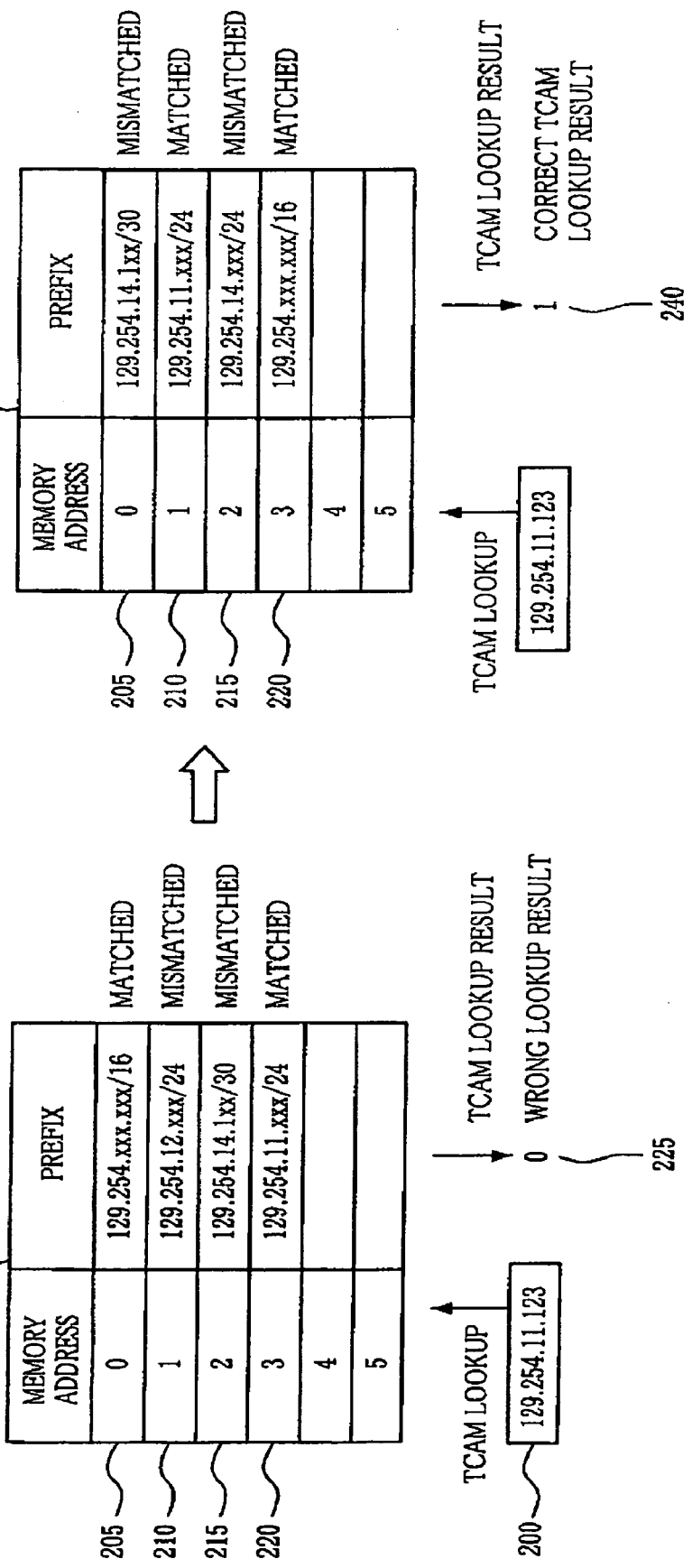
FIG. 2 is an exemplary view for explaining a longest prefix match process in Ternary Contents Address Memory (TCAM).
Figure 3:
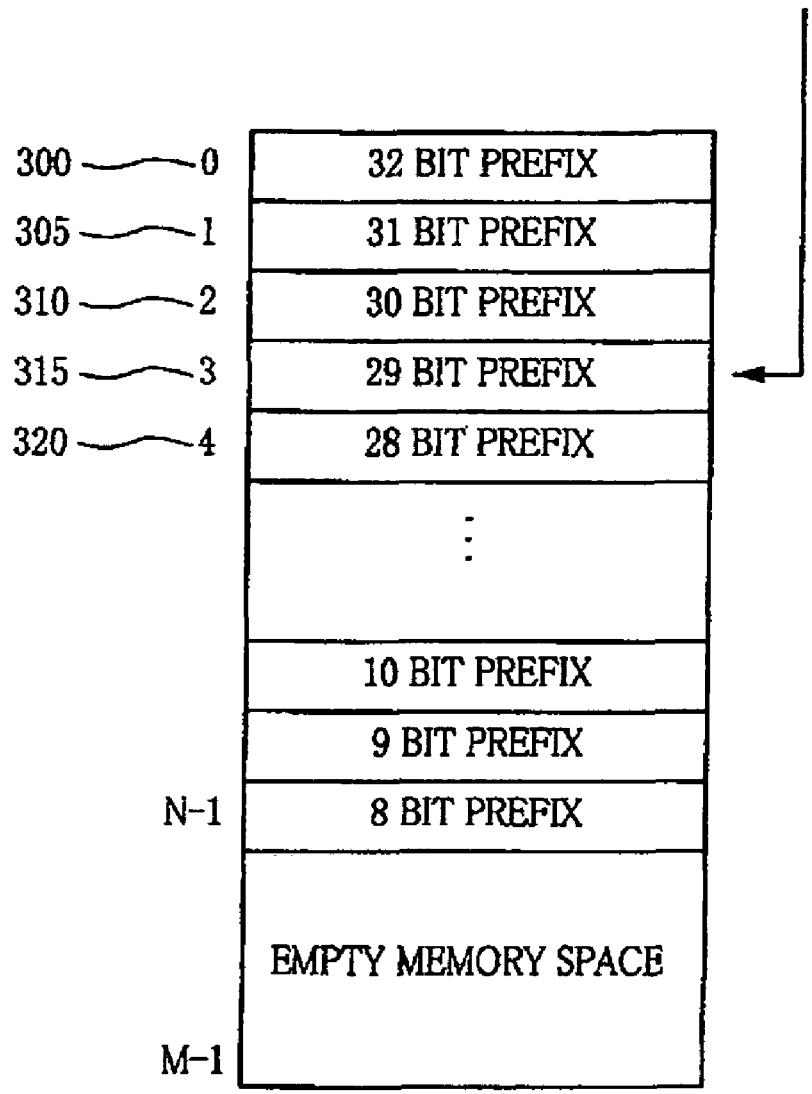
FIG. 3 illustrates a conventional TCAM table for a longest prefix match.
Figure 4:
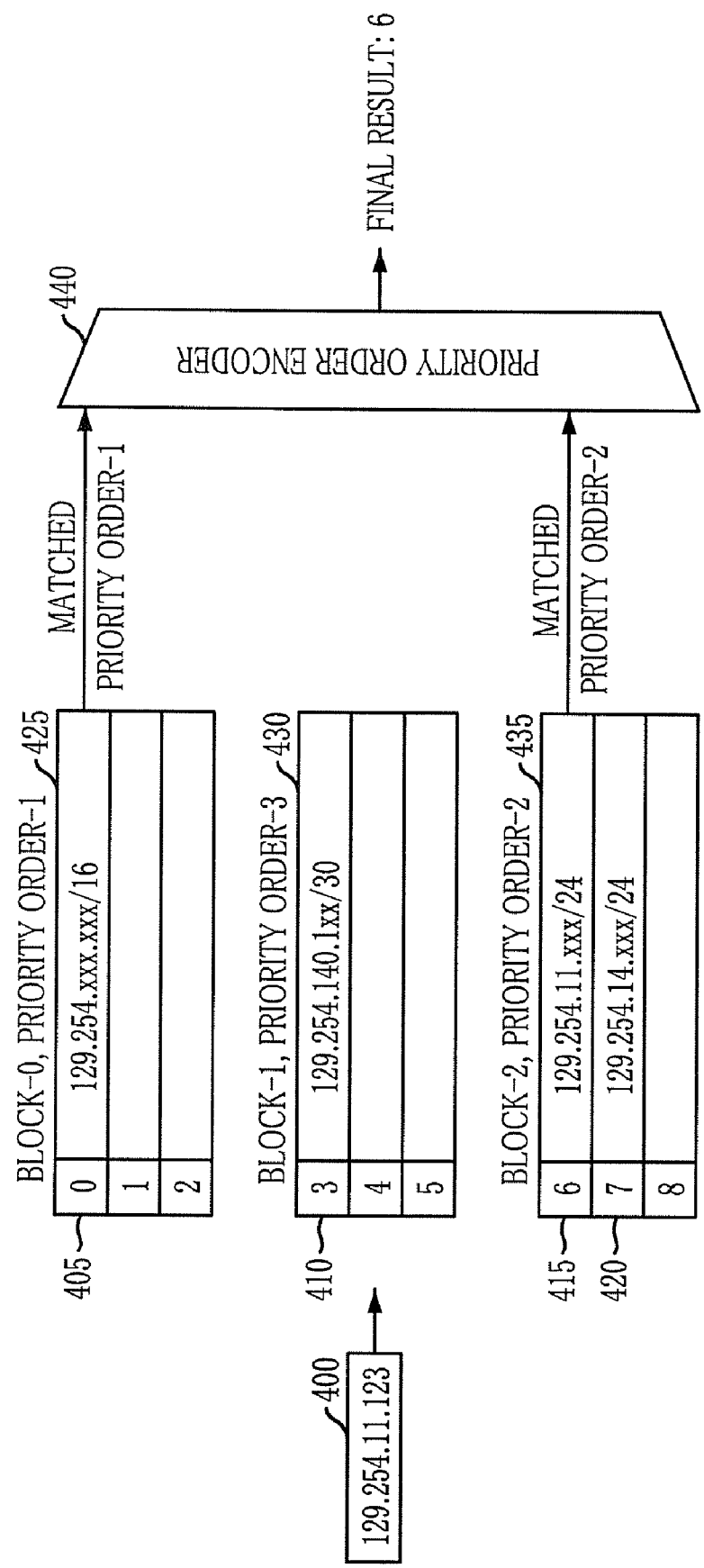
FIG. 4 is an exemplary view for explaining a priority TCAM operation to which the present invention is applied.

FIG. 4 is an exemplary view for explaining a priority TCAM operation to which the present invention is applied.

In the present invention, a priority Ternary Contents Address Memory (TCAM) is used to divide the memory area of TCAM according to priority. Referring to FIG. 4, the priority TCAM, unlike the existing TCAM, has a memory area that is divided into fixed-sized blocks, each block being assigned with a priority order.

For a better understanding, the memory area of TCAM shown in FIG. 4 is composed of block-0 (425), block-1 (430), and block-2 (430), each having three entries. And the block-0 is assigned with $1^{st}$ priority, the block-1 is assigned with $2^{nd}$ priority, and the block-2 is assigned with $3^{rd}$ priority. The block-0 stores a routing entry "405" having a 16-bit prefix length, the block-1 stores a routing entry "410" having a 30-bit prefix length, and the block-2 stores routing entries "415" and "420", each having a 24-bit prefix length.

At this time, the routing entries that match with an input packet 400 are "405" and "415". In this case, the typical TCAM would select the "405" being inputted to the highest address and output a resulting address 0. However, in the priority-based TCAM, a priority encoder 440 compares priorities between the routing entries 405 and 415 matching with the input packet 400, and produces a routing entry with a higher priority as a result. In an example of FIG. 4, "405" has the $1^{st}$ priority and "415" has the $2^{nd}$ priority, so "415" with a higher priority is selected and a resulting address 6 is outputted.

In the present invention, these properties of the priority TCAM are utilized to manage routing entries for longest prefix match operation. That is, all routing entries are organized in the form of chain-ancestor-tree, so that each routing entry is assigned with a priority and stored in a corresponding block according to priority.

The reason for establishing a chain-ancestor-tree is as follows.

In general, the easiest way to assign a priority to each routing entry is simply assigning a priority in the order of prefix length ("Prefix-Length-Order"). However, a problem with this method is that fragmentation of routing entry storage may cause a serious memory waste of TCAM. For instance, when a priority is assigned to a routing entry according to the Prefix-Length-Order, a relationship between prefix length and priority is assigned in the form of [prefix length: priority]. That is, relationships may be expressed like [32:32], [31:31], [30:30] ..., [2:2], and [1:1]. In this case, however, when it is assumed that there are 100 routing entries, and 31 routing entries of them have different prefix lengths and the rest 69 routing entries have the same routing prefix length of the remaining one, each of those 31 blocks stores only one routing entry. Generally, since one block of the priority TCAM can store up to 1024 routing entries, (31*1024)−31 memory areas of TCAM would be wasted. In case of IPv6, a maximum prefix length can be 128 bits, so even greater memory space in TCAM could be wasted.

Therefore, the present invention suggests a method capable of storing, in one priority TCAM, routing entries of different prefix lengths together by organizing a chain-ancestor-tree, by using the properties of a routing prefix to be given below. Before organizing the chain-ancestor-tree, a prefix-ancestor-relationship by routing prefix lengths will be discussed first in reference to FIG. 5.

Figure 5:
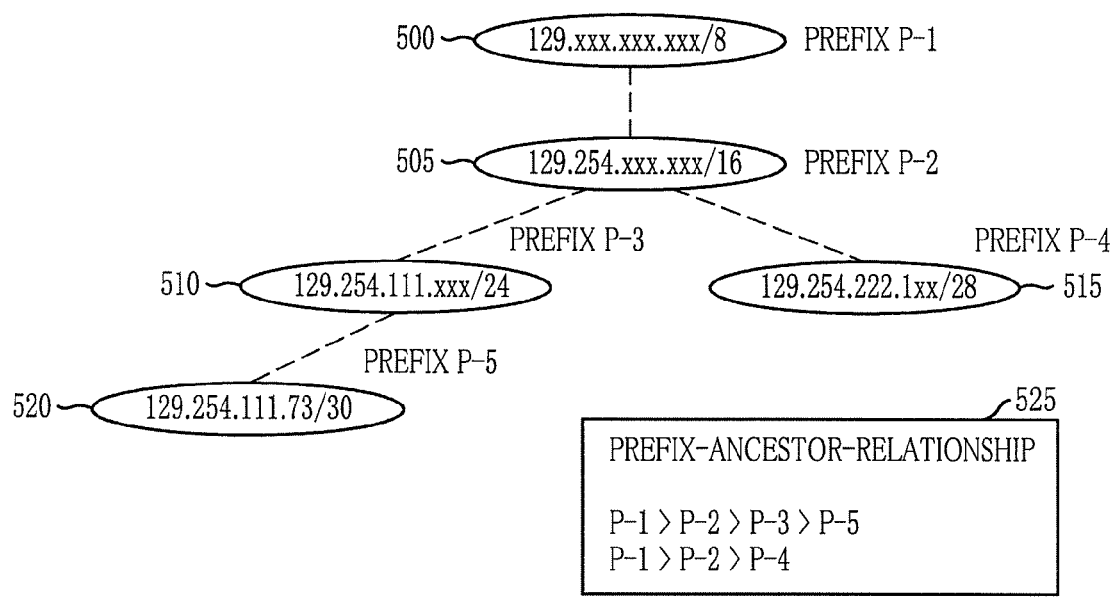
FIG. 5 shows an example of the prefix-ancestor-relationship defined by the present invention.

FIG. 5 is an explanatory view showing an example of the prefix-ancestor-relationship defined by the present invention.

Referring to FIG. 5, routing entries "500", "505", "510", "515", and "520" may be expressed in the form of tree according to prefix length. For instance, "505" and "500" are equal in the first 8 bits of the prefix length, and "505" having a 16-bit prefix length is greater than that of "500". Thus, "500" is a parent node and ancestor, and "505" is a child node and descendant of "500". Similarly, "510" has a 24-bit prefix length and is equal to "129.254" of "505" in the first 16 bits, so "510" is a child node of "505". This relationship applies until "520". Meanwhile, in case of "515", it can be a child node of "505". However, although it has a 28-bit prefix length greater than "510" having the 24-bit prefix length, the 24-bit prefix length of "515" is "129.254.222" that is different from the prefix "129.254.111" of "510", so a parent-child-relationship is not made therebetween. Also, the parent-child-relationship is not made between "515" and "520" because they are different in both prefix length and prefix value.

Therefore, the ancestor relationship of prefix may be indicated with two chains like "525", and thus a parent-ancestor-tree can be expressed as shown in FIG. 5. The reason why the prefix-ancestor-relationship is important is because when two different routing entries belong to a chain based on the prefix-ancestor-relationship, a routing entry belonging to a descendant, rather than an ancestor, should have a higher priority, to satisfy conditions of the longest prefix match. On the contrary, a routing entry not belonging to the prefix-ancestor-relationship chain can be stored in the memory of TCAM, regardless of priority, even if it has a different prefix length.

Figure 6:
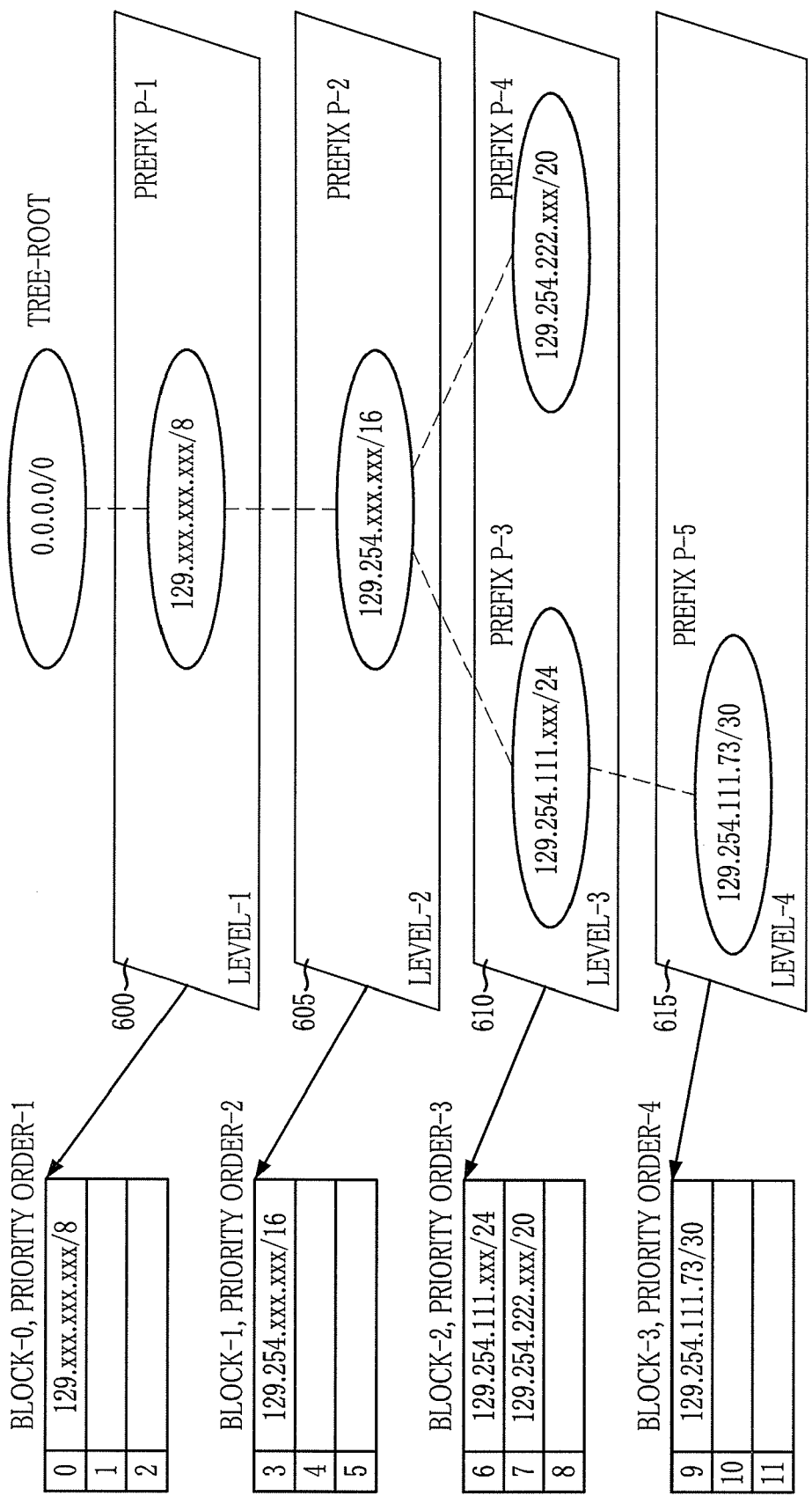
FIG. 6 shows a chain-ancestor-tree and a prioritizing method in accordance with an embodiment of the present invention.

FIG. 6 shows a chain-ancestor-tree and a prioritizing method in accordance with an embodiment of the present invention.

In FIG. 6, TCAM priority blocks where routing entries are to be stored by the chain-ancestor-tree are illustrated. A tree-level may be determined by depths of the chain-ancestor-tree, which is divided into level-1 (600), level-2 (605), level-3 (610), and level-4 (615), as shown in FIG. 6. Routing entries belonging to each level are assigned with the same priority as the level number, and are stored in a TCAM block of corresponding priority. As depicted in FIG. 6, even though routing entries P-3 and P-4 may have different prefixes from each other, they are not affected by the priority relationship for the longest prefix match and thus can be stored in the same priority block. In this manner, since routing entries having different prefix lengths can be stored in a block with the same priority, memory fragmentation of TCAM is reduced, thereby improving the efficiency of memory operation.

The performance by changes in TCAM lookup table is important as much as increasing the memory efficiency of TCAM as set forth above. Such a TCAM lookup table modification algorithm will be explained with reference to FIGS. 7 and 9.

Figure 7:
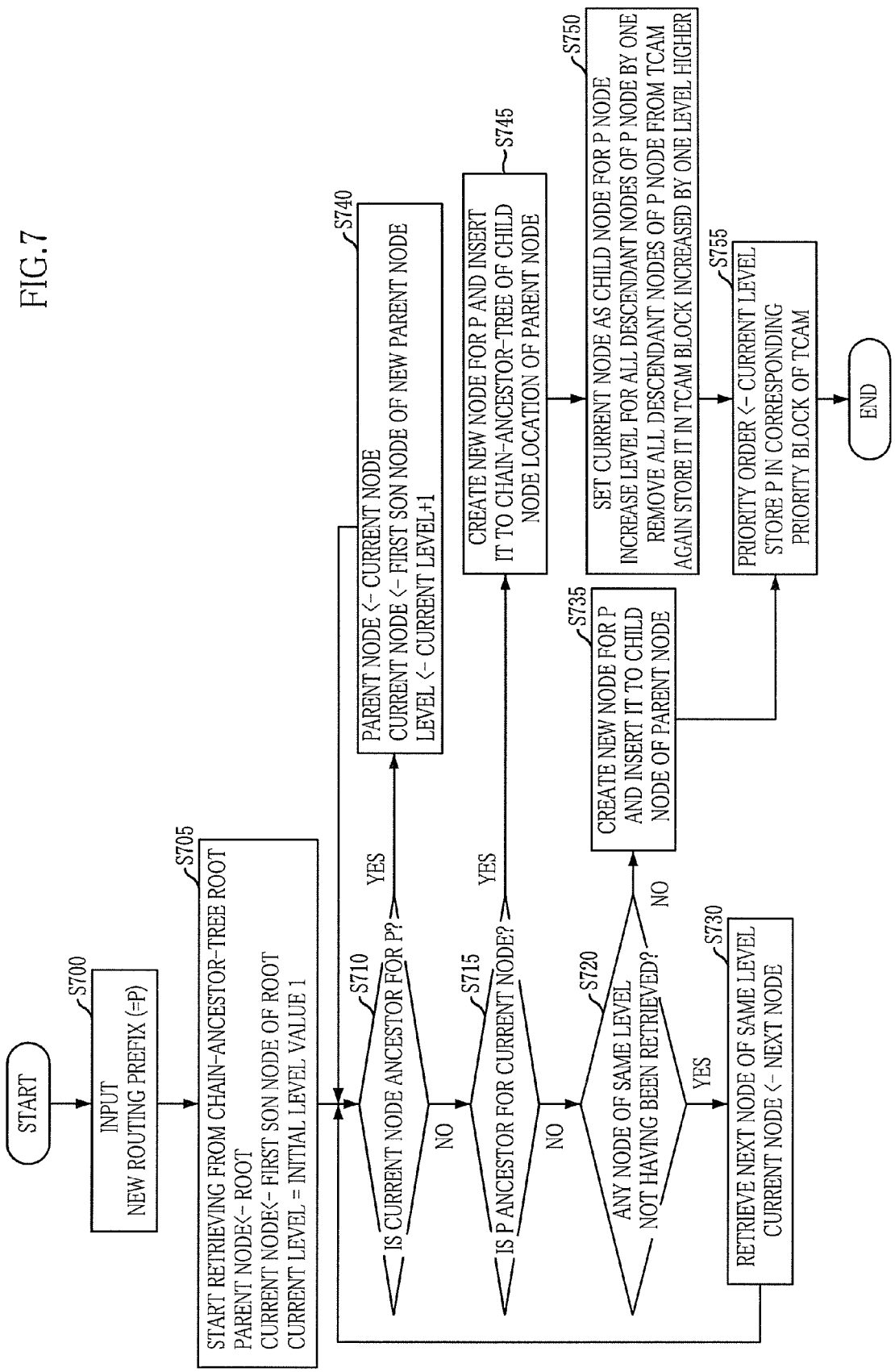
FIG. 7 is a flowchart describing a routing entry addition process in accordance with an embodiment of the present invention.

FIG. 7 is a flowchart describing a routing entry addition process in accordance with an embodiment of the present invention, and particularly illustrates an algorithm for adding a new routing prefix during a TCAM routing table operation.

First of all, when a new routing entry (prefix=P) is inputted during a TCAM routing table operation (S700), children nodes of the root of the chain-ancestor-tree are sequentially retrieved one by one. A current node being retrieved for the first time becomes a first child node of the root node, and a current level has a value of level 1 that is a lower node level of the root (S705).

Next, the prefix-ancestor-relationship between the current node and the input prefix P is compared (S710). If the current node is a prefix-ancestor for P, the current node becomes a parent node for another comparison with lower nodes of the current node, and by using the first child node of a new parent node as a current node (S740), the prefix-ancestor-relationship comparison between the current node and P is performed recursively (S710).

If the comparison result shows that the current node is not the prefix-ancestor for P (S710), comparison is conversely made to find out if P is the prefix-ancestor for the current node (S715).

If the comparison result indicates that P is the prefix-ancestor for the current node (S715), a new node corresponding to P is created, and with a parent node of the current node as a parent, the new node is inserted to the chain-ancestor-tree (i.e., the chain-ancestor-tree at a position for a child node of the parent node) (S745). Thereafter, because P has to be a parent node for the current node, the parent node of the current node is designated as P, all the descendant nodes (including the current node) of the current node are increased one by one, are removed from a TCAM block corresponding to the current level, and are stored again in a TCAM block corresponding to a level increased one by one (S750). Next, P is stored in a TCAM block at a level corresponding to the newly inputted P node (S755).

In the meantime, when the comparison result shows that P is not an ancestor for the current node (S715), indicating that the prefix-ancestor-relationship has not been established between P and the current node, it is checked if there exist other brother nodes at the same level of the current node, which have not been compared with P yet, so as to compare other brother nodes of the current node with P (S720).

If the checking result indicates that there is a brother node (S720), a next brother node is set to the current node (S730), and the process of the invention returns to step S710 to carry out a subsequent process.

However, when the checking result shows that there is no node that has not been retrieved or compared with (S720), this means that there is no longer a node in the prefix-ancestor-relationship at the current level. Therefore, with a parent node at the current level as a parent, a new node corresponding to P is created and inserted to the chain-ancestor-tree (S735), and P is stored in a TCAM block with a priority corresponding to the current level (S755).

According to the algorithm shown in FIG. 7, when routing entries already stored in TCAM blocks are rearranged, the process is performed in the order of "S715"->"Yes"->"S745"->"S750"->"S755". A specific example thereof will now be explained in reference to FIG. 8.

Figure 8:
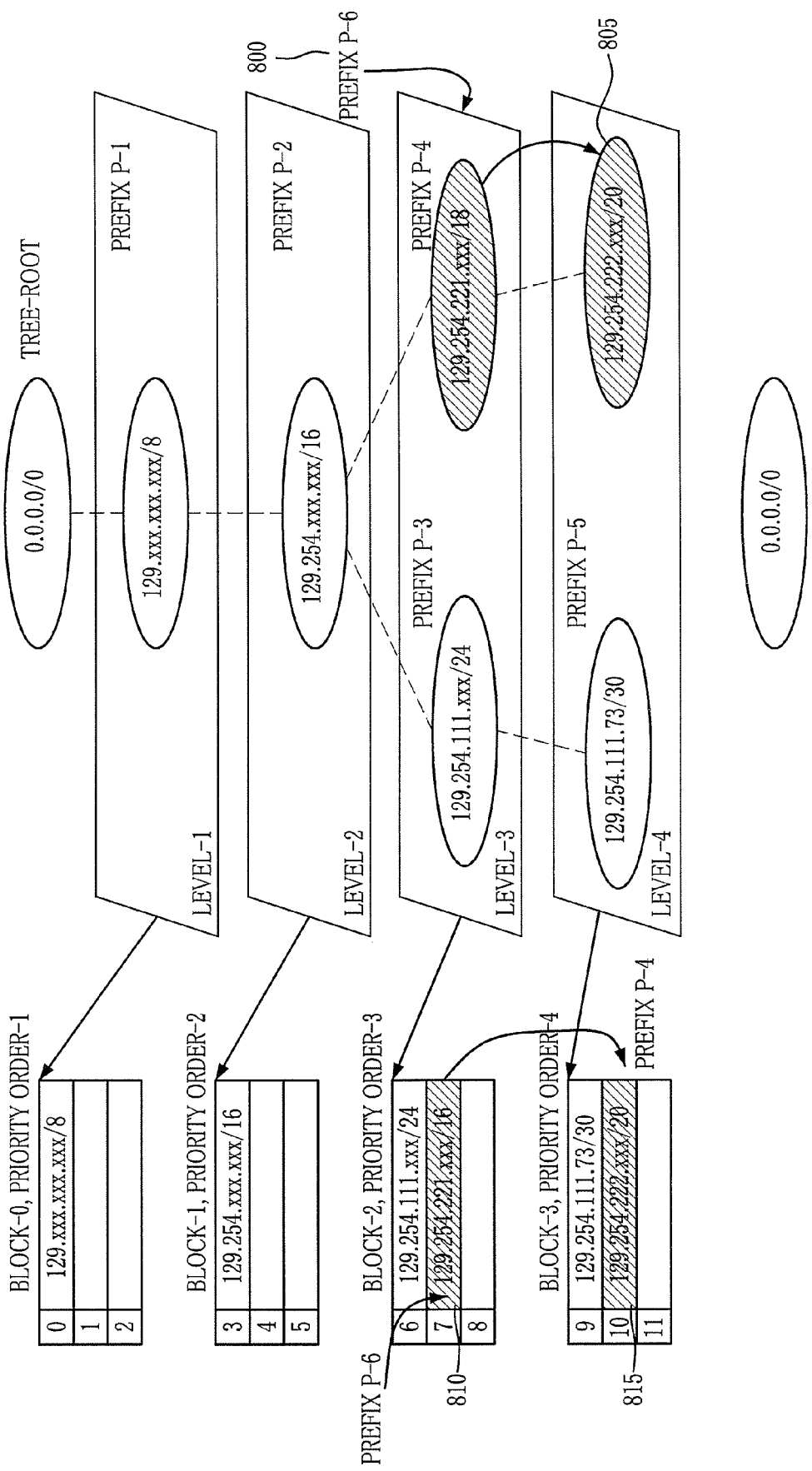
FIG. 8 shows a routing entry addition process in accordance with an embodiment of the present invention.

FIG. 8 shows a routing entry addition process in accordance with an embodiment of the present invention.

In particular, FIG. 8 illustrates a result obtained when a new routing entry is added in FIG. 6. Referring to FIG. 8, when a new routing entry "800" (prefix P-6) is inputted, the newly inputted routing entry "800" is compared with an existing node "805" to establish a prefix-ancestor-relationship. Since the routing entry "800" is the prefix-ancestor for the existing node "805", a new node corresponding to the inputted routing entry "800" is created and inserted to the chain-ancestor-tree and the existing node "805" moves to one level lower (level increase) to have the newly inserted "800" node as a parent node. Moreover, because the "805" node moves to one level lower (level increase) increasing the priority by one level, its location is moved from "810" to "815" of TCAM block and the routing entry "800" (prefix P-6) is stored in the empty space of "810".

FIG. 9 is a flowchart describing an example of a routing entry deletion process in accordance with an embodiment of the present invention, and specifically illustrates an algorithm for managing the chain-ancestor-tree and for adjusting a TCAM routing table when a routing entry is deleted.

First of all, when a routing prefix (=P) to be deleted is inputted (S900), a node matching with P is retrieved in the chain-ancestor-tree (S905) and it is checked whether the retrieval has succeeded (S910). At this time, the retrieval is done by sequentially searching the chain-ancestor-tree or by building a hash table.

If the retrieval result is checked to be failed (S910), it is an incorrect input, so the process is ended (S925). Meanwhile, when the retrieval has succeeded, it is checked whether a child node exists in a node corresponding to P (S915).

If the checking result shows that a child node does not exist (S915), only P node may be deleted. So the P node is deleted from the chain-ancestor-tree and from a corresponding TCAM block (S920).

However, when the checking result shows that there is a child node (S915), the P node is deleted from the chain-ancestor-tree and from the TCAM block, and children nodes of the P node are designated as a child node of the P node's parent node (S930). Next, levels of the children and descendant nodes of the deleted P node are all lowered by one in the chain-ancestor-tree and are all deleted from a TCAM block that are currently stored, and are stored again in a TCAM block decreased by one level (S935).

With the chain-ancestor-tree and the TCAM routing table being organized and operated in this manner, when the TCAM routing table needs to be modified upon input of a new routing entry, routing entries already stored will have to be moved in the number of times as much as the length of the prefix-ancestor-chain even in worst cases, in order to maintain the arranged state for the longest prefix match. In general, in Internet where a router is actually operated, the length of such a prefix-ancestor-chain is 3-4 or shorter and does not exceed 10 at the most. Therefore, the method of the present invention can markedly improve the performance, compared with the conventional TCAM lookup table arrangement method in which tens to thousands of movements have to be taken place at the very worst.

The following is a summarization for a method for using the TCAM memory more efficiently and enabling effective and quick operation/management of the TCAM lookup table in case TCAM is used for configuring a high-speed router as set forth above.

First, in accordance with the present invention, a lookup table (routing table) is configured by dividing a memory area of TCAM into fixed-size blocks according to priority. More specifically, all priority blocks are not assigned with priorities at the time of initialization of the routing system, but when a routing entry having a certain priority needs to be inputted, a random empty block and a corresponding priority order are assigned to the routing entry.

Next, each routing entry being inputted to the lookup table is assigned with priority depending on prefix length. To be more specific, this prioritizing process includes the steps of configuring a chain-ancestor-tree depending on prefix length of each routing entry (including a routing entry which is newly inputted or has already been inputted and designated in the lookup table) associated with the lookup table, and assigning a priority depending on the level height of the chain-ancestor-tree having been configured.

In the above process, the step of configuring the chain-ancestor-tree includes the steps of investigating a prefix-ancestor-relationship between routing entries by using prefix information of each routing entry associated with the lookup table, and inserting, for two routing entries satisfying the prefix-ancestor-relationship based on the investigation result, a routing entry with a short prefix length to a parent position and a routing entry with a long prefix length to a child position.

Specifically, the step of investigating the prefix-ancestor-relationship between routing entries includes the steps of comparing prefix lengths of the two different routing entries to designate a short prefix as a comparative prefix length, acknowledging the existence of the prefix-ancestor-relationship when the two routing entries match each other by their comparison as much as the comparative prefix length, and designating the routing entry having a short prefix length out of the two routing entries in the prefix-ancestor-relationship as an ancestor of the routing entry having a long prefix length.

Moreover, the step of assigning a priority depending on the level height of the chain-ancestor-tree includes the steps of setting a group of nodes having the same height as the chain-ancestor-tree to a same level, setting a root node of the chain-ancestor-tree to height 0 and level 0, and increasing the level by one whenever the height of the chain-ancestor-tree increases by one.

Next, the routing entries assigned with priorities are stored in the lookup table blocks of their respective corresponding priorities.

Thereafter, when there is a change in the lookup table during the operation of the routing system, the lookup table is modified to maintain the arranged state for the longest prefix match. More concretely, the lookup table modification includes the steps of creating a new chain-ancestor-tree node when a new routing entry is inputted, inserting the new routing entry to a suitable position of the chain-ancestor-tree, and storing it in the actual TCAM lookup table; and retrieving and deleting an existing routing entry from the chain-ancestor-tree, and deleting the routing entry from the actual TCAM lookup table.

At this time, the step of processing the new routing entry includes the steps of checking a prefix-ancestor-relationship with a routing entry being newly inputted by increasing one level each time from the root of the chain-ancestor-tree; creating a new node when the prefix-ancestor-relationship is not established, inserting the new node to a current comparative level of the chain-ancestor-tree, and assigning a priority corresponding to the level to the newly inputted routing entry; when the prefix-ancestor-relationship is established, checking whether the newly inputted routing entry is an ancestor, and when the newly inputted routing entry is an ancestor, emptying a position thereof by moving the node of the chain-ancestor-tree being currently compared and all descendants of the current node one level down (i.e., increasing one level each time), and inserting the newly inputted routing entry to the empty position; when the newly inputted routing entry is not an ancestor, designating the newly inputted routing entry as a child node of the node of the chain-ancestor-tree being currently compared, and performing the comparison by proceeding to the step of checking the prefix-ancestor-relationship; and when the newly inputted routing entry is assigned with a priority by determination of a position at the chain-ancestor-tree, storing the routing entry in an empty space of a corresponding priority TCAM block.

Here, when other nodes at the chain-ancestor-tree moved by the newly inputted routing entry, the step of processing the new routing entry further includes the step of deleting a routing entry corresponding to the node from the priority block of the TCAM routing table, and again storing it in a priority block corresponding to the level of a changed position.

Further, the step of deleting the existing routing entry includes the steps of performing a comparison until a routing entry to be deleted is matched while increasing one level each time from the root node of the chain-ancestor-tree; when a matching routing entry exists, deleting the routing entry from the chain-ancestor-tree; and when the deleted node has a child node, designating the corresponding child node as a child of the parent node of the deleted node.

Here, when other nodes at the chain-ancestor-tree moved by the deleted routing entry, the step of deleting the existing routing entry includes the step of deleting a routing entry corresponding to the node from a priority block of the TCAM routing table, and again storing it in a priority block corresponding to the level of the modified position.

As explained above, the present invention is advantageous in TCAM routing table maintenance/management for a longest prefix match in that the expansive TCAM memory can be efficiently used without waste.

In addition, the present invention provides a fast, efficient algorithm for a routing table that is frequently modified during the router operation, and thus can improve the performance of the router that requires a high-speed routing function.

As a result, the present invention minimizes movements of routing entries having already been stored by effectively incorporating and dividing the chain-ancestor-tree, thereby achieving rapid routing updates.

The method of the present invention as mentioned above may be implemented by a software program that is stored in a computer-readable recording medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the specific embodiments, it will be apparent to those skilled in the art that various changes and modifications may be made without departing from the spirit and scope of the invention as defined in the following claims.

What is claimed is:

1. A method for Ternary Contents Address Memory (TCAM) table management, comprising the steps of:
   a) dividing a memory area of TCAM into fixed-size blocks depending on priority to configure a lookup table;
   b) assigning a priority to each routing entry being inputted to the lookup table based on prefix length;
   c) storing a routing entry having been assigned with a priority in a lookup table block of a corresponding priority; and
   d) when a modification occurs in the lookup table, modifying the lookup table to maintain an arranged state for a longest prefix match,
   wherein the step b) comprises the steps of:
      b1) configuring a chain-ancestor-tree depending on prefix length of each routing entry associated with the lookup table; and
      b2) assigning a priority based on the level height of the chain-ancestor-tree configured.

2. The method of claim 1, wherein the step a) includes the steps of:
  a1) setting all priority blocks in a non-priority state at the time of initialization of a routing system; and
  a2) when a routing entry with a priority needs to be inputted, assigning a random empty block as a corresponding priority block and assigning a corresponding priority thereto.

3. The method of claim 1, wherein the step b1) includes the steps of:
  b1-1) investigating a prefix-ancestor-relationship between routing entries by using prefix information of each routing entry associated with the lookup table; and
  b1-2) for two routing entries satisfying the prefix-ancestor-relationship based on the investigation result, inserting a routing entry with a short prefix length to a parent position and inserting a routing entry with a long prefix length to a child position.

4. The method of claim 3, wherein the step b1-1) includes the steps of:
  b1-1-1) comparing prefix lengths of the two different routing entries to designate a short prefix as a comparative prefix length;
  b1-1-2) acknowledging the existence of the prefix-ancestor-relationship when the two routing entries match each other by their comparison as much as the comparative prefix length; and
  b1-1-3) designating the routing entry having a short prefix length out of the two routing entries in the prefix-ancestor-relationship as an ancestor of the routing entry having a long prefix length.

5. The method of claim 1, wherein the step b2) includes the steps of:
  b2-1) setting a group of nodes having the same height as the chain-ancestor-tree to a same level;
  b2-2) setting a root node of the chain-ancestor-tree to height 0 and level 0; and
  b2-3) increasing level by one whenever the height of the chain-ancestor-tree increases by one.

6. The method of claim 1, wherein the step d) includes the steps of:
  d1) when a new routing entry is inputted, creating a new chain-ancestor-tree node, inserting the new routing entry to a suitable position of the new chain-ancestor-tree, and storing it in an actual TCAM lookup table; and
  d2) when an existing routing entry needs to be deleted from the new chain-ancestor-tree, retrieving and deleting the existing routing entry from the actual TCAM lookup table.

7. The method of claim 6, wherein the step d1) includes the steps of:
  d1-1) investigating a prefix-ancestor-relationship with a routing entry being newly inputted while increasing one level each time from the root of the new chain-ancestor-tree;
  d1-2) when the prefix-ancestor-relationship is not established, creating a new node, inserting the new node to a current comparative level of the new chain-ancestor-tree, and assigning a priority corresponding to a level to the newly inputted routing entry;
  d1-3) when the prefix-ancestor-relationship is established, checking whether the newly inputted routing entry is an ancestor;
  d1-4) when the newly inputted routing entry is an ancestor, emptying a position thereof by moving a current node of the new chain-ancestor-tree being currently compared and all descendants of the current node one level down, and inserting the newly inputted routing entry to the empty position;
  d1-5) when the newly inputted routing entry is not an ancestor, designating the newly inputted routing entry as a child node of the node of the chain-ancestor-tree being currently compared, and performing a comparison by returning to the step d1-1); and
  d1-6) when the newly inputted routing entry is assigned with a priority by determination of a position at the new chain-ancestor-tree, storing the newly inputted routing entry in an empty space of a corresponding priority TCAM block.

8. The method of claim 7, further comprising the step of:
  d1-7) when other nodes at the new chain-ancestor-tree are moved by the newly inputted routing entry, deleting a routing entry corresponding to the node from the priority block of the TCAM routing table, and again storing it in a priority block corresponding to the level of a changed position.

9. The method of claim 6, wherein the step d2) includes the steps of:
  d2-1) performing a comparison until a routing entry to be deleted is matched while increasing one level each time from the root node of the new chain-ancestor-tree;
  d2-2) when a matching routing entry exists, deleting the matched routing entry from the new chain-ancestor-tree; and
  d2-3) when the deleted node has a child node, designating a corresponding child node as a child of a parent node of the deleted node.

10. The method of claim 9, further comprising the step of:
  d2-4) when other nodes at the new chain chain-ancestor-tree are moved by the deleted routing entry, deleting a routing entry corresponding to a node from a priority block of the TCAM routing table, and again storing it in a priority block corresponding to a level of a modified position.

11. A computer-readable recording medium for recording a program that implements a method in a routing system with a processor, the method comprising the steps of:
  a) dividing a memory area of Ternary Contents Address Memory (TCAM) into fixed-size blocks depending on priority to configure a lookup table;
  b) assigning a priority to each routing entry being inputted to the lookup table based on prefix length;
  c) storing a routing entry having been assigned with a priority in a lookup table block of a corresponding priority; and
  d) when a modification occurs in the lookup table, modifying the lookup table to maintain an arranged state for a longest prefix match,
  wherein the step b) comprises the steps of:
    b1) configuring a chain-ancestor-tree depending on prefix length of each routing entry associated with the lookup table; and
    b2) assigning a priority based on the level height of the chain-ancestor-tree configured.

* * * * *